(12) United States Patent
Falb et al.

(10) Patent No.: US 7,797,803 B2
(45) Date of Patent: Sep. 21, 2010

(54) SEAT BELT BUCKLE

(76) Inventors: Margo B. Falb, 4341 Westway Ave., Dallas, TX (US) 75205; Harris B. Falb, 4341 Westway Ave., Dallas, TX (US) 75205; Calvin R. Bentsen, 100 Savannah Ave., Suite 360, McAllen, TX (US) 78503; Robert G. Walker, 420 W. Ingle Dr., Ossian, IN (US) 46777

( * ) Notice: Subject to any disclaimer, the term of this patent is extended or adjusted under 35 U.S.C. 154(b) by 861 days.

(21) Appl. No.: 11/676,382

(22) Filed: Feb. 19, 2007

(65) Prior Publication Data

US 2007/0204442 A1    Sep. 6, 2007

Related U.S. Application Data

(63) Continuation-in-part of application No. 11/175,100, filed on Jul. 5, 2005, now Pat. No. 7,178,208.

(51) Int. Cl.
  *A44B 11/25* (2006.01)

(52) U.S. Cl. .................. 24/633; 24/579.11

(58) Field of Classification Search ............ 24/633, 24/579.09, 579.11; 280/808, 801.1; 180/268
See application file for complete search history.

(56) References Cited

U.S. PATENT DOCUMENTS

| 3,875,556 | A | 4/1975 | Beaird |
|---|---|---|---|
| 4,162,715 | A | 7/1979 | Coulombe |
| 4,432,119 | A | 2/1984 | Schwark et al. |
| 4,849,733 | A | 7/1989 | Conigliaro et al. |
| 4,885,566 | A | 12/1989 | Aoki et al. |
| 5,121,527 | A | 6/1992 | Righi |
| 5,123,498 | A | 6/1992 | Alcidi et al. |
| 5,199,138 | A | 4/1993 | Morita |
| 5,274,890 | A | 1/1994 | Shimizu et al. |
| 5,406,252 | A | 4/1995 | Dear |
| 5,435,046 | A | 7/1995 | Miyauchi et al. |
| 5,483,221 | A | 1/1996 | Mutter et al. |
| 5,520,263 | A | 5/1996 | Suran et al. |
| 5,555,458 | A | 9/1996 | Large |
| 5,752,299 | A | 5/1998 | Vivacqua et al. |
| 5,760,684 | A | 6/1998 | Orbach |
| 5,966,784 | A | 10/1999 | Arbogast et al. |
| 6,002,325 | A | 12/1999 | Conaway |

(Continued)

FOREIGN PATENT DOCUMENTS

JP    10-226314    8/1998

(Continued)

*Primary Examiner*—Robert J Sandy
(74) *Attorney, Agent, or Firm*—Baker & Daniels LLP

(57) ABSTRACT

A seat belt improvement providing seat belt buckling assistance and automatic release of the seat belt. The seat belt assembly includes an electromagnet located in the seat belt buckle that aligns and draws the seat belt tongue into the seat belt buckle when the seat belt tongue is in close proximity to the seat belt buckle. The buckle may be formed with a funnel region adjacent its open end to assist in aligning the seat belt tongue with the opening of the housing and thereafter engaging the seat belt tongue with the latch mechanism. The buckle may additionally include a manual release element. The buckle may further include one or more illuminated areas to assist the passenger in visually locating the seat belt buckle and/or the manual release element.

20 Claims, 10 Drawing Sheets

U.S. PATENT DOCUMENTS

| | | |
|---|---|---|
| 6,059,066 A | 5/2000 | Lary |
| 6,215,395 B1 | 4/2001 | Slaughter et al. |
| 6,351,210 B1 | 2/2002 | Stewart |
| 6,362,734 B1 | 3/2002 | McQuade et al. |
| 6,389,661 B1 | 5/2002 | Brown et al. |
| 6,485,058 B1 | 11/2002 | Kohlndorfer et al. |
| 6,556,903 B2 | 4/2003 | Chinigo et al. |
| 6,669,234 B2 | 12/2003 | Kohlndorfer et al. |
| 6,977,582 B2 | 12/2005 | Ota et al. |
| 7,002,457 B2 | 2/2006 | Stevenson et al. |
| 7,121,509 B2 | 10/2006 | Cordina et al. |
| 7,199,703 B2 | 4/2007 | Okita et al. |
| 7,271,712 B2 | 9/2007 | Rubel |
| 2006/0080812 A1 | 4/2006 | O'Brien et al. |
| 2009/0058061 A1 | 3/2009 | Fuisz et al. |
| 2009/0132128 A1 | 5/2009 | Marriott et al. |

FOREIGN PATENT DOCUMENTS

| | | |
|---|---|---|
| JP | 11-321562 | 11/1999 |
| JP | 2008-183958 | 8/2008 |

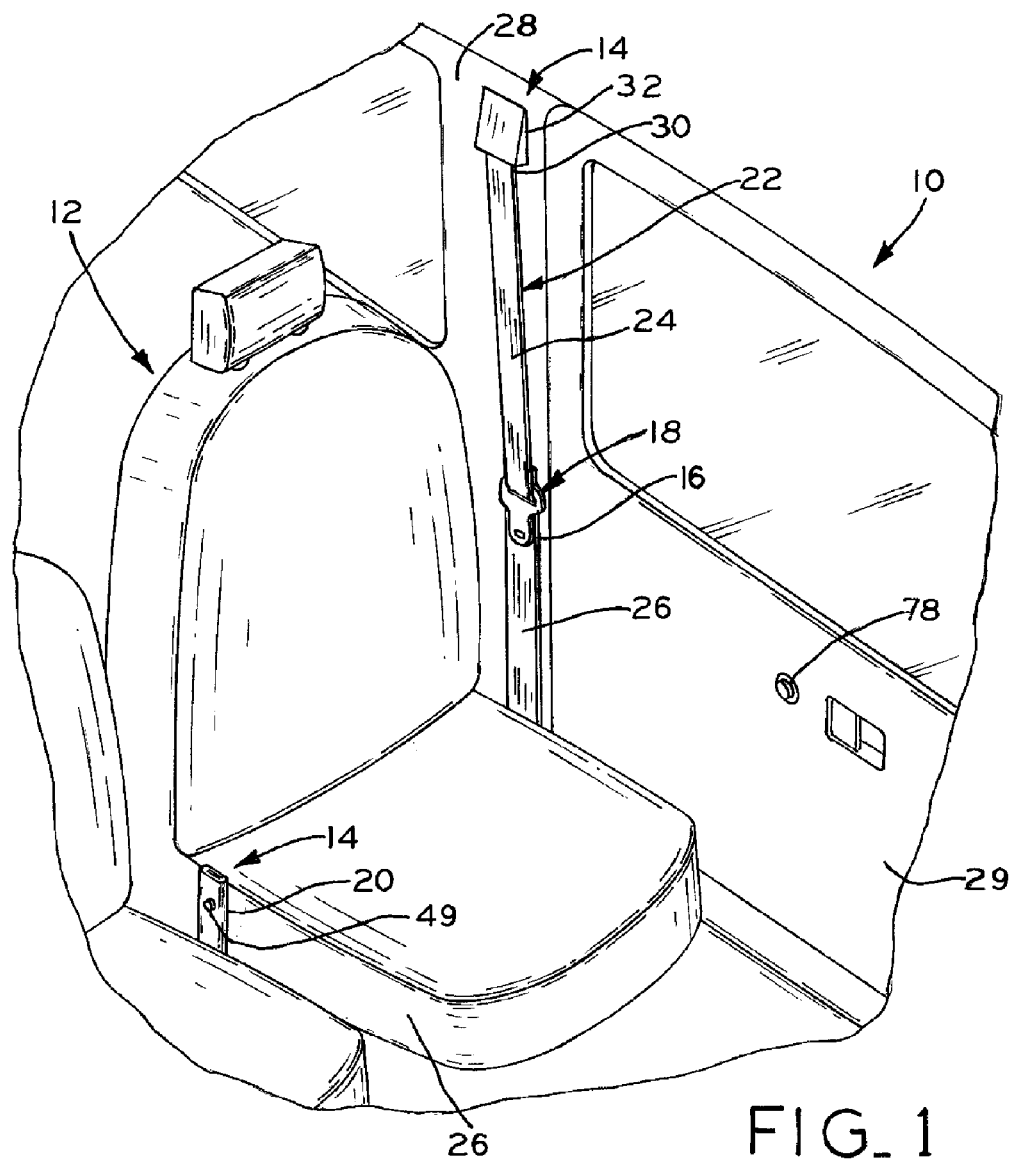
FIG_1
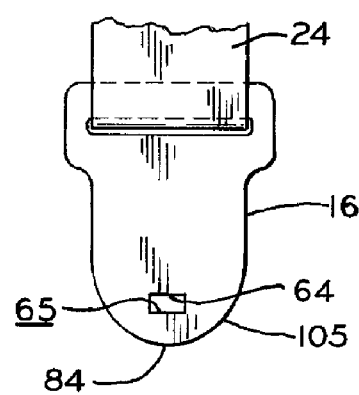
FIG_7

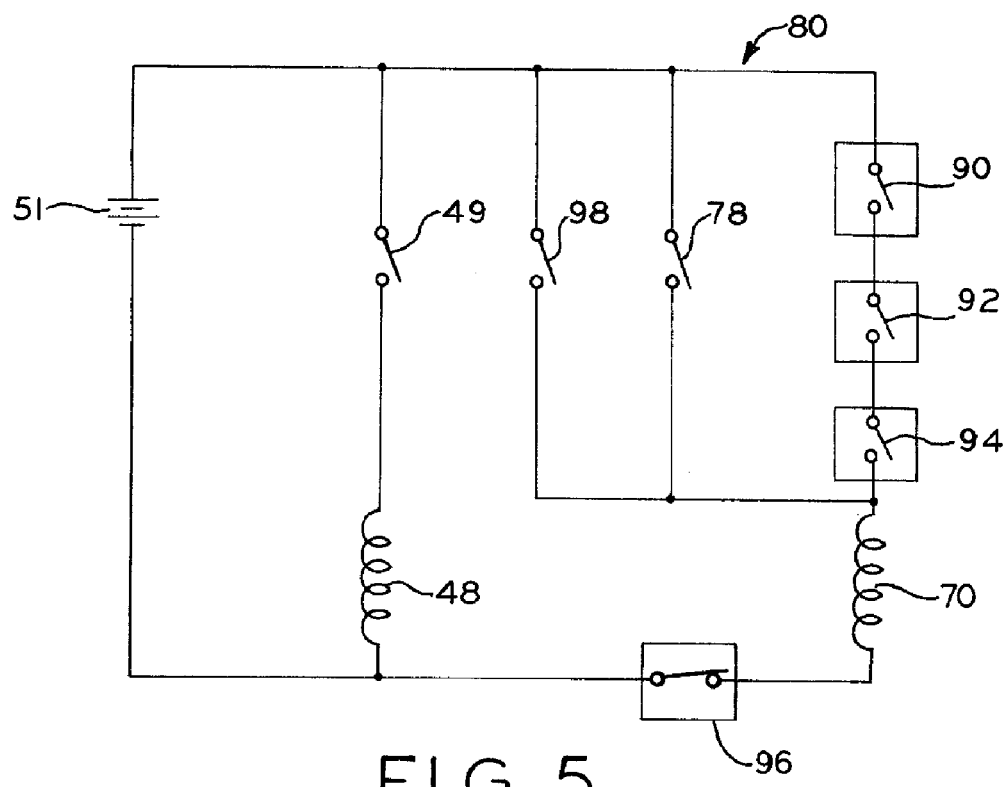
FIG_5
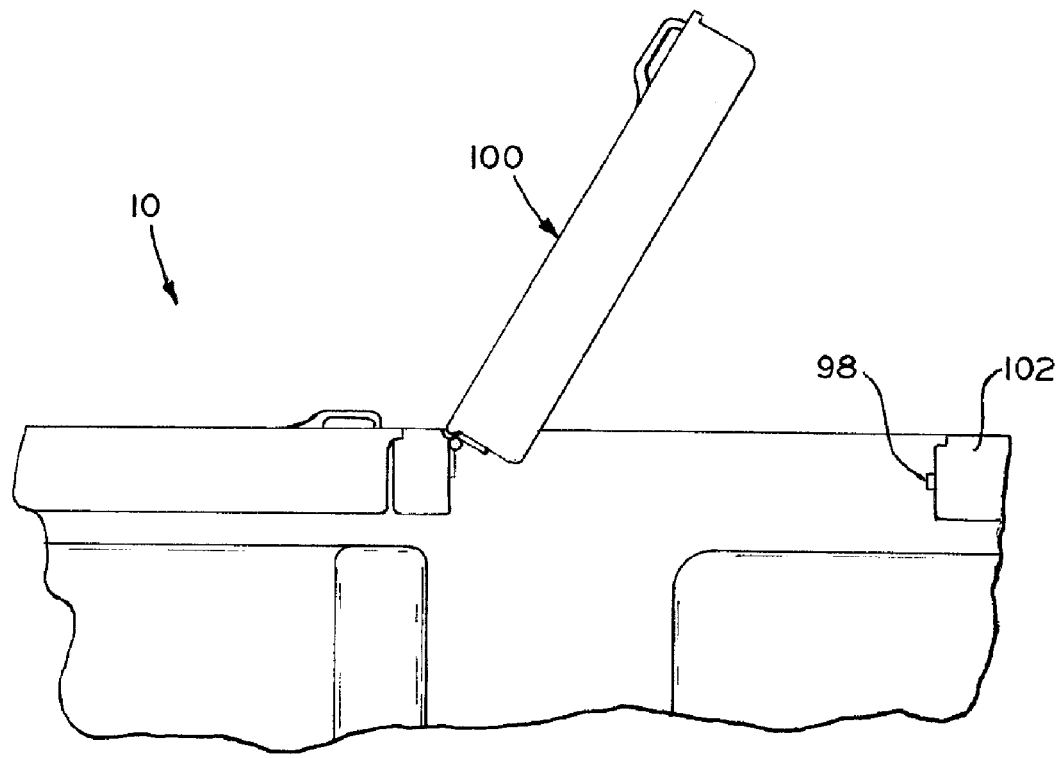
FIG_6

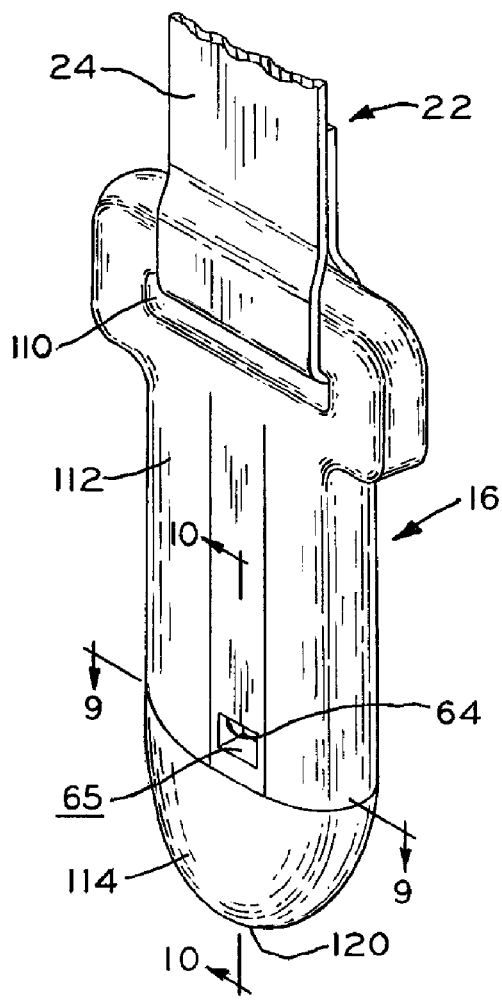
FIG_8
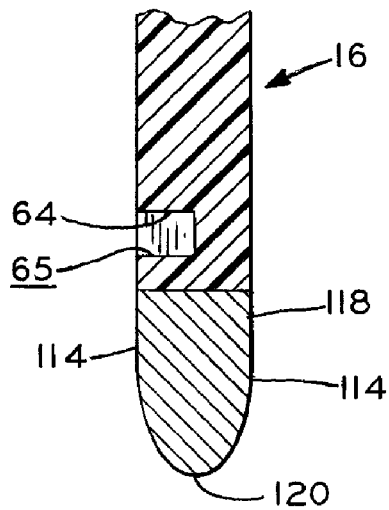
FIG_10
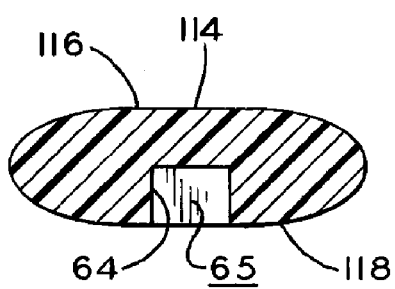
FIG_9
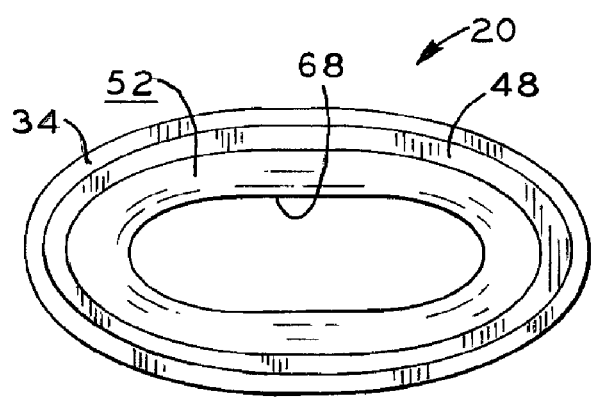
FIG_11

FIG_17

SEAT BELT BUCKLE

CROSS-REFERENCE TO RELATED APPLICATIONS

This application is a continuation-in-part of U.S. patent application Ser. No. 11/175,100, entitled SEAT BELT WITH MAGNETICALLY SEATED BUCKLE AND AUTOMATIC RELEASE, filed on Jul. 5, 2005, now U.S. Pat. No. 7,178,208, the disclosure of which is expressly incorporated herein by reference.

BACKGROUND OF THE INVENTION

1. Field of the Invention

The present invention relates to seat belt device having a magnetic means that assists in seat belt buckling and having an automatic seat belt release.

2. Description of the Related Art

Vehicles are provided with seat belt assemblies that typically include a metal seat belt tongue that is received by a female portion or buckle of the assembly. The tongue is adjustably mounted on a fabric seat belt strap. The seat belt buckle includes a body that houses a latch mechanism or catch. The seat belt tongue is received in a slot located in one end of the seat belt buckle. Once the tongue is seated in the seat belt buckle, the catch captures the tongue, locking the seat belt strap portions in place across the seat occupant until the catch is manually released.

The seat belt buckle is rigidly mounted on the inside edge of the driver and passenger seats, or within the rear seats. The seat belt straps are mounted on the opposite side of the seat occupant from the seat belt buckle. One end of each of the seat belt straps is fixedly mounted within the vehicle while the opposite end may be mounted in a retracting wind-up assembly that allows the seat belt strap to be used and then automatically returned to an unused, storage position. In order to use the seat belt, the seat occupant must reach across himself to grab the seat belt strap and must then pull the seat belt strap across himself, locate the seat belt buckle, and insert the seat belt tongue in the seat belt buckle. To release the seat belt tongue from the buckle, a button located on the seat belt buckle is depressed. The seat belt tongue is released and the seat belt strap is returned to the unused, storage position.

One common problem with conventional seat belt assemblies is that the twisting movement required of the seat occupant when locating the seat belt buckle and fastening the seat belt can be uncomfortable and difficult depending on the size and physical condition of the occupant. This task proves difficult for some people in that the seat belt buckle is often rigidly mounted to the seat and tucked between the seat and a center console, for example. Therefore, the seat belt buckle is difficult and awkward to reach. Further, the aperture in the buckle is difficult to locate and insert the seat belt tongue into. Buckling and releasing the seat belt is therefore challenging for many persons.

Further problems exist with buckling a child's seat belt and securing child safety seats. The seat belts are sometimes difficult to both latch and release because the operator must reach across the child occupant, or both the child and the safety seat, making the seat belt buckle difficult to locate, and making it difficult to reach and release the seat belt. In addition, with manually releasable seat belts, children may be able to release their own seat belts while the vehicle is being operated, which is undesirable.

Prior art devices used to automatically buckle a seat belt assembly are complicated and potentially costly when installed in a vehicle. One prior art method of automatically buckling the seat belt includes a sensor that detects when the seat belt tongue is in close proximity to the seat belt buckle and then energizes a solenoid. The seat belt tongue is attracted by the solenoid to draw the tongue toward the slot formed in the seat belt buckle. As the tongue is drawn deeper into the seat belt buckle, an ejector is pushed backward and a latch mechanism, operated by a motor, secures the tongue within the seat belt buckle. In order to release the tongue, a switch is operated to reverse the rotation of the motor and release the latch mechanism. A spring biases the tongue out of the seat belt catch. In an alternative prior art seat belt device, a solenoid is used to operate latch arms that engage and draw the seat belt tongue into the seat belt buckle.

Releasing the seat belt tongue from the seat belt buckle may be as difficult as latching the seat belt for a seat occupant. Prior art release mechanisms typically include springs that eject the seat belt tongue from the seat belt buckle. In addition, automatic release mechanisms are generally enabled only during an emergency situation such as a vehicle collision.

It is desired to provide a seat belt device that assists with the buckling of the seat belt and an automatic release mechanism to release the seat belt during typical use of a vehicle.

SUMMARY OF THE INVENTION

The present invention relates to a seat belt improvement that provides assisted buckling of the seat belt as well as automatic release when the vehicle is in the "park" position. The female portion of the seat belt assembly, also called the seat belt buckle, has a relatively wide open throat for reception of the seat belt tongue. The seat belt assembly includes an electromagnet located at the entry opening of the seat belt buckle that aligns and draws the tongue of the seat belt into the seat belt buckle until a catch captures the seat belt tongue. The electromagnet is energized by a switch, located in the belt wind-up mechanism, when the seat belt tongue is in close proximity to the seat belt buckle. In addition, a solenoid located in the seat belt buckle is used to release the seat belt tongue from the buckle. When the vehicle transmission is in the "park" position, the ignition is turned off, and the key is removed, the solenoid is energized to pull down the catch in the seat belt buckle, thus releasing the seat belt tongue. Further, a switch may be conveniently located in the vehicle such as on the seat belt buckle, near the window, on the door, or the like so that the solenoid can be activated and the seat belt assembly may be released to allow a passenger to exit the vehicle without turning the vehicle ignition off.

In another embodiment, the housing of the seat belt buckle may be formed with a funnel region adjacent its open end. The funnel region may have a substantially fluted or cone shape that opens outwardly to assist in aligning the seat belt tongue with the opening of the housing, and thereafter, in engaging the seat belt tongue with the latch mechanism. In this manner, initial contact between the seat belt tongue and the funnel region of the housing tends to direct or channel the end of the seat belt tongue downwardly into the housing for engagement of the seat belt tongue with the latch mechanism within the housing. Also, the seat belt buckle may additionally include a manual release element in addition to the automatic release.

Further, the seat belt buckle may include one or more illuminated areas. The illuminated areas may be formed as portions of the funnel region of the buckle, the manual release, and/or the switch of the buckle assist mechanism, and may include one or more lighting devices such as light emitting diodes ("LED's"), for example, which are illuminated by power supplied from the battery of the automobile. In one embodiment, the illuminated area of the funnel region of the seat belt buckle is illuminated upon passenger entry into the vehicle to assist the passenger in visually locating the seat belt buckle and/or the switch of the buckle assist mechanism for engaging the seat belt tongue with the buckle. The illuminated areas of the funnel region of the buckle and/or the switch of the buckle assist mechanism may be controlled by a switch on the vehicle door, for example. After the seat belt tongue has been engaged with the seat belt buckle and/or after the vehicle is started, the illuminated area may turn off. In another embodiment, the illuminated area of the manual release is illuminated when the vehicle is in a parked position or when the engine has been turned off, to assist a passenger in visually locating the manual release of the seat belt buckle for disengaging the seat belt tongue from the buckle.

In one form thereof, the present invention provides a seat belt buckle assembly, including a housing including a first end having an opening; a funnel region disposed adjacent the first end of the housing, the funnel region substantially aligned with the opening; and a latch mechanism disposed within the housing.

In another form thereof, the present invention provides a seat belt buckle assembly, including a housing including a first end having an opening; at least one lighting element disposed proximate the first end; and a latch mechanism disposed within the housing.

In another form thereof, the present invention provides a seat belt buckle assembly, including a seat belt including a tongue; a housing including a first end having an opening; a latch mechanism disposed within the housing; and a latch assist assembly, including first and second switches; and an electromagnet operable to move the latch mechanism to a disengaged position with respect to the seat belt tongue upon actuation of the first switch prior to insertion of the seat belt tongue into the buckle assembly, and operable to allow the latch mechanism to move to an engaged position with respect to the seat belt tongue upon actuation of the second switch after insertion of the seat belt tongue into the buckle assembly.

The present invention comprises, in one form thereof, a seat belt fastening apparatus for a vehicle, the apparatus including a tongue and a buckle. The buckle includes an open aperture and a latch with the latch disposed in the aperture. The buckle further includes a first electromagnet, the first electromagnet operative to generate an electromagnetic flux field for attracting the tongue into the aperture when the tongue is disposed in the vicinity of the aperture to cause the latch to retain the tongue in the buckle. A release mechanism is operatively associated with the latch. The release mechanism includes a second electromagnet and a switch, whereby when the switch is closed the second electromagnet is energized and the latch is moved to release the tongue from the buckle.

The present invention comprises, in another form thereof, a seat belt fastening apparatus for a vehicle. The apparatus includes a tongue and a buckle. The buckle includes an open aperture and a latch with the latch disposed in the aperture. The buckle further includes a first electromagnet and a first switch for energizing the first electromagnet to thereby generate an electromagnetic flux field for attracting the tongue into the aperture when the tongue is disposed in the vicinity of the aperture to cause the latch to retain the tongue in the buckle. A release mechanism is operatively associated with the latch. The release mechanism includes a second electromagnet and a second switch, whereby when the second switch is closed the second electromagnet is energized and the latch is moved to release the tongue from the buckle.

An advantage of the present invention is that both the wide mouth opening of the seat belt buckle and the electromagnet assist in buckling the seat belt for those who have difficulty with buckling a seat belt.

A further advantage of the present invention is that the seat belt assembly may be automatically released either when the vehicle transmission is placed in the "park" position, the ignition is turned off, and the key is removed from the ignition, or alternatively when a release button is activated allowing a seat occupant to exit the vehicle without requiring the ignition to be turned off.

An additional advantage of the present invention is that the automatic release of the seat belt helps in unbuckling children seated in the rear of the vehicle or in child safety seats, and further prevents a child from releasing his own seat belt while the vehicle is being operated.

A further advantage of the invention is that by making the seat belt tongue relatively large and rounded and by providing a seat belt buckle with a wide opening, it is relatively easy for an occupant of the automobile to locate the opening of the buckle and to insert the tongue into the buckle opening. Further, by providing an electromagnetic circuit, the tongue is then automatically guided into the opening and latched in the buckle.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein:

FIG. 1 is a fragmentary perspective view of one seat in a vehicle having a seat belt assembly in accordance with the present invention;

FIG. 5 is a schematic view of the electrical circuit used to operate a magnetic used to assist with buckling the seat belt and an automatic release mechanism of the seat belt assembly of the present invention;

FIG. 6 is an elevational view of a rear vehicle door having a release switch mounted in the door frame thereof;

FIG. 7 is an enlarged view of the seat belt tongue of FIG. 1;

FIG. 8 is a perspective view of an alternate embodiment of a seat belt tongue according to the present invention;

FIG. 9 is a cross sectional view of the tongue of FIG. 8 taken along lines 9-9;

FIG. 10 is a cross sectional view of the tongue of FIG. 8 taken along lines 10-10;

FIG. 11 is a top view of a seat belt buckle which matches the contours of the seat belt tongue of FIG. 8;

Figure 2:
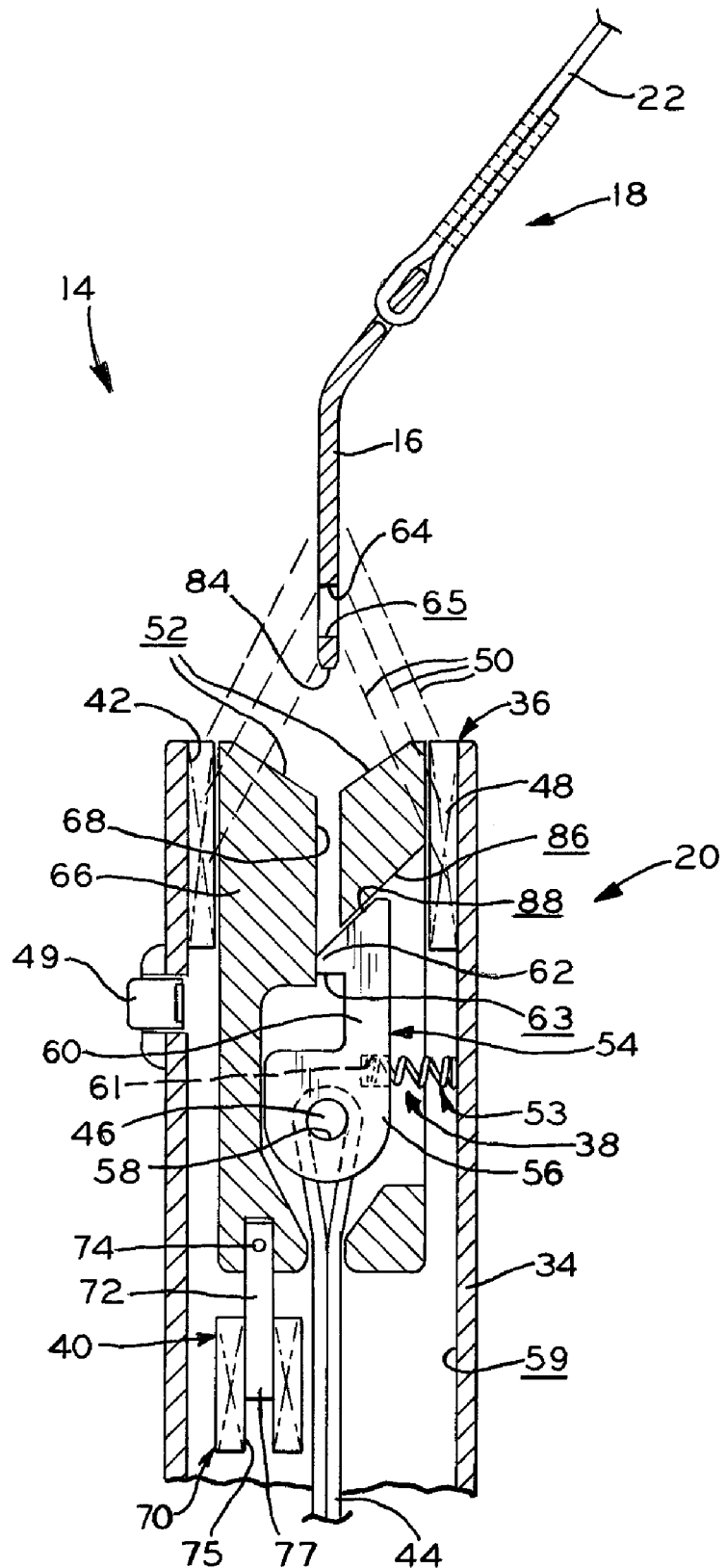
FIG. 2 is a sectional view a seat belt buckle of the seat belt assembly of FIG. 1 showing the seat belt buckle in an unlatched position.

Corresponding reference characters indicate corresponding parts throughout the several views. Although the exemplifications set out herein illustrate embodiments of the invention, the embodiments disclosed below are not intended to be exhaustive or to be construed as limiting the scope of the invention to the precise forms disclosed.

DETAILED DESCRIPTION

Vehicle manufacturers are typically required to supply each seat in vehicles with a seat belt assembly. A vehicle includes at least front driver and passenger seats and often includes rear passenger seats. Referring to FIG. 1, vehicle 10 includes driver seat 12 having seat belt assembly 14. Even though driver seat 12 is the only vehicle seat illustrated, it is understood that seat belt assembly 14 may be modified to accommodate passengers seated in the other seats in vehicle 10.

As seen in FIGS. 1 and 7, seat 12 is provided with seat belt assembly 14 that includes catch assembly 18 which includes a seat belt tongue 16 with an opening 64 formed therein. Seat belt tongue 16 is constructed from any suitable metal that has magnetic properties. Seat belt tongue 16 is received in a female portion of assembly 14, namely, seat belt buckle 20. Opening 64 is engaged by a latching mechanism, described further hereinbelow, to secure seat belt assembly 14 about the seat occupant. Seat belt tongue 16 is adjustably mounted on fabric seat belt strap 22 of seat belt assembly 14 with the location of seat belt tongue 16 dividing seat belt strap 22 into shoulder portion 24 and lap portion 26.

Seat belt strap 22 is mounted to interior 28 of vehicle 10. As illustrated in FIG. 1, strap 22 for the front seats 12 is positioned adjacent vehicle door 29 with end 30 of seat belt strap 22 being mounted above seat 12. Seat belt strap end 30 is mounted in housing 32 and is coiled about a belt wind-up mechanism (not shown). The belt wind-up mechanism allows seat belt strap 22 to be returned to the position illustrated in FIG. 1 after use of seat belt assembly 14. In addition, the belt wind-up mechanism maintains a predetermined amount of tension on seat belt strap 22 to prevent the strap from being loose around the seat occupant. The belt wind-up mechanism also has means for locking if the vehicle slows down quickly, to thereby prevent the seat occupant from falling forward, away from seat 12. The opposite end of seat belt strap 22 (not shown) is rigidly fastened to vehicle interior 28 by any suitable method including fasteners such as bolts.

Seat belt buckle 20 is rigidly mounted within vehicle 10 on an opposite side of seat 12 from that of seat belt strap 22, thus allowing seat belt strap 22 to be arranged across the seat occupant, and thereby securing the seat occupant in the seat. Seat belt buckle 20 is commonly located against inside surface 26 of driver seat 12 or the passenger seat (not shown). When positioning seat belt buckle 20 in the rear seats, the buckle is often mounted to extend from between the seat and back portions of the seats.

In order to engage seat belt assembly 14, the occupant pulls seat belt strap 22 out of the belt wind-up mechanism and across his or her body by seat belt tongue 16. Seat belt tongue 16 is moved into proximity of seat belt buckle 20 and seat belt tongue 16 is then captured within buckle 20 as will be described further hereinbelow. Once seat belt tongue 16 is engaged in seat belt buckle 20, shoulder and lap portions 24 and 26 are defined across the seat occupant's body.

Figure 3:
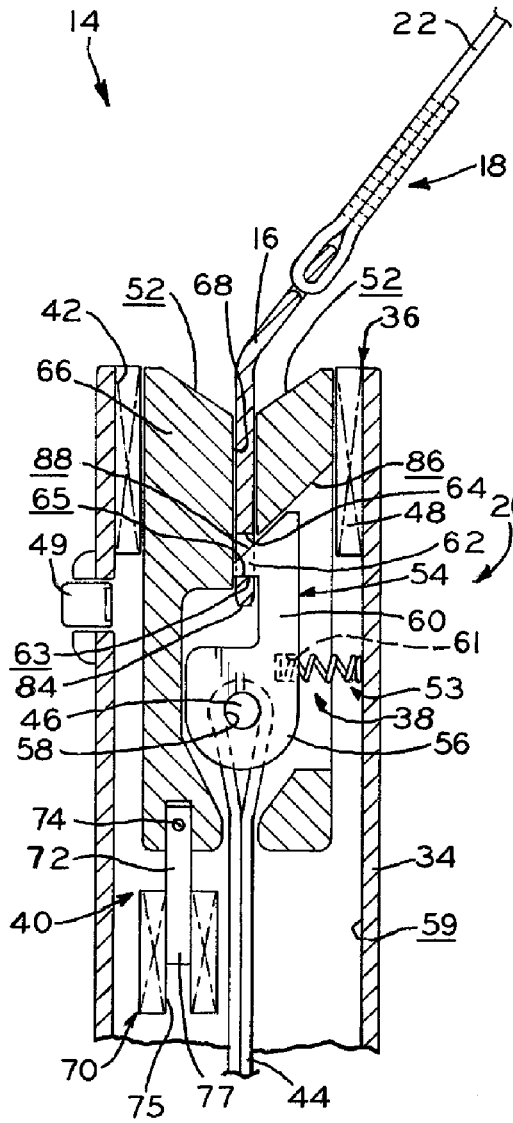
FIG. 3 is a sectional view a seat belt buckle of the seat belt assembly of FIG. 1 showing the seat belt buckle in a latched position.
Figure 4:
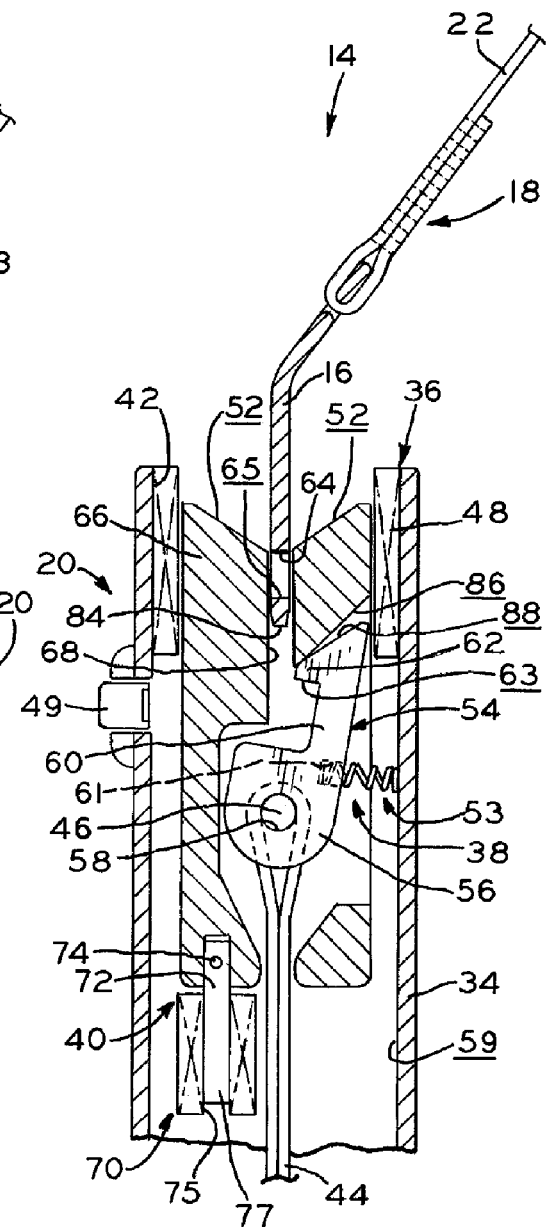
FIG. 4 is a sectional view a seat belt buckle of the seat belt assembly of FIG. 1 after an automatic releasing device has been activated and the seat belt tongue has been released.

Referring to FIGS. 2, 3, and 4, seat belt buckle 20 includes housing 34 that houses buckle assist mechanism 36, latching mechanism 38, and automatic release mechanism 40. Housing 34 is formed from any suitable material including plastic by a process such as injection molding. Housing 34 has a wide mouthed tapered opening 42 in one end thereof that is shaped to easily receive seat belt tongue 16. The opposite end of housing 34 is also provided with an opening (not shown) through which securing strap 44 passes to mount seat belt buckle 20 to vehicle 10. Securing strap 44 is generally constructed from the same fabric material as strap 22. Strap 44 is looped over rod 46 of latching mechanism 38 and both ends of strap 44 are secured to the frame of vehicle 10 by any suitable means including fasteners such as bolts.

Seat belt buckle 20 is rigidly mounted in vehicle 10 in that its location adjacent seat 12 is fixed. The length of securing strap 44 is fixed, preventing the location of seat belt buckle 20 from being varied relative to seat 12.

Buckle assist mechanism 36, latching mechanism 38, and auto release mechanism 40 are all provided to simplify the use of seat belt assembly 14. Referring to FIGS. 2, 3, and 4, buckle assist mechanism 36 includes electromagnet 48 positioned near wide mouth opening 42 of buckle housing 34. Electromagnet 48 is energized by a switch located in the belt wind-up mechanism in strap housing 32 when seat belt tongue 16 is in close proximity to seat belt buckle 20. Alternatively, electromagnetic 48 may be energized by switch 49 located on seat belt buckle housing 34. Switch 49 is electrically connected to battery 51 of vehicle 10 by circuit 80 illustrated in FIG. 5. It is understood that the energization of electromagnet 48 may be accomplished by various methods including mounting the switch elsewhere in the vehicle, i.e. on the vehicle door, dashboard, or the like. Further, electromagnet 48 may be energized by operation of the vehicle. Energization of electromagnet 48 creates magnetic flux 50 (FIG. 2) that attracts metal seat belt tongue 16 when tongue 16 is in close proximity to seat belt buckle 20. Magnetic flux 50 draws seat belt tongue 16 toward seat belt buckle 20 and, in combination with sloping surfaces 52 of latching mechanism 38, directs seat belt tongue 16 into a slot 68 of buckle 20.

Once seat belt tongue 16 is received in seat belt buckle 20, latching mechanism 38 operates to secure seat belt assembly 14 about a seat occupant until automatic or manual release of the mechanism. Latching mechanism 38 includes a catch or latch 54 that is pivotally mounted on rod 46 that is also used to mount seat belt buckle 20 in vehicle 10. Latch 54 is constructed from any suitable material that is able to withstand forces exerted by the seat occupant including forces applied to straps 22 if the vehicle slows down quickly. Latch 54 includes main body portion 56 having aperture 58 formed therein to receive rod 46. Integrally formed with main body portion 56 is extension portion 60 that has hook portion 62 located the end thereof. Latch 54 is biased by spring 53 into an initial position shown in FIG. 2 and a latched position shown in FIG. 4. One end of spring 53 engages inner surface 59 of buckle housing 34 and the opposite end of spring 53 is received in aperture 61 formed in extension portion 60 to maintain the first position of latch 54 and return latch 54 to the latched position. Hook portion 62 is received in opening 64 formed in seat belt tongue 16 with lower surface 63 of hook portion 62 being in abutting contact surface 65 of opening 64 (FIG. 3). Latch 54 has then captured and releasably secured seat belt tongue 16 into secure engagement with seat belt buckle 20.

Automatic release mechanism 40 is located within seat belt buckle housing 34 and is operably coupled to latching mechanism 38. Automatic release mechanism 40 includes releasing member 66 that is slidably mounted within buckle housing 34. The outer dimensions of releasing member 66 are smaller than the inner dimensions of electromagnet 48 such that releasing member 66 slides within electromagnet 48. Releasing member 66 has sloping surface 52 defined at the upper end thereof. Sloping surfaces 52 help to direct seat belt tongue 16 into slot 68 located in releasing member 66. Seat belt tongue 16 is positioned in slot 68 and advanced therein until tongue opening 64 is captured by hook portion 62 of latch 54.

Automatic release mechanism 40 further includes solenoid 70 located in the lower portion of seat belt buckle housing 34, beneath releasing member 66. Solenoid 70 is operatively coupled to releasing member 66 by linkage 72. Linkage 72 is fixedly secured to at one end 74 to releasing member 66 by any suitable fastening method. Opposite end portion 77 of linkage 72 is slidably received in slot 75 formed in solenoid 70. Solenoid 70 is also electrically connected to vehicle battery 51 by circuit 80 (FIG. 5). This electrical connection allows seat belt tongue 16 to be automatically released under specific vehicle conditions or upon actuation as will be described further hereinbelow.

The specific, predetermined vehicle conditions that allow solenoid 70 to be energized include the vehicle transmission being in the "park" position, the ignition being turned off, and the key being removed. Referring to FIG. 5, each condition is represented by a switch; ignition condition switch 90, transmission condition switch 92, and key condition switch 94. These switches 90, 92, and 94 are open until the vehicle conditions are met. When all three switches 90, 92, and 94 are closed, solenoid 70 is energized. The energization of solenoid 70 causes solenoid 70 to pull down releasing member 66 in seat belt buckle 20, and release seat belt tongue 16.

Automatic release mechanism 40 further includes a button or switch 78 (FIGS. 1 and 5) that allows for manual actuation of mechanism 40 if the specified vehicle conditions for automatic release of mechanism 40 are not met. Switch 78 may be located anywhere within vehicle 10 such as being mounted on seat belt buckle housing 34 with switch 49, near the vehicle window on the door (FIG. 1), on the vehicle dashboard, or the like. Operation of switch 78 allows solenoid 70 to be activated manually. The manual actuation of solenoid 70 releases seat belt tongue 16 to allow a passenger to exit vehicle 10 without turning the vehicle ignition off.

In alternative embodiments, children located in the rear seats may have a tendency to remove their seat belts when the vehicle is being operated. In order to prevent this scenario, switch 78 for the rear seat belt release may be located in the front seat of the vehicle as shown in FIG. 1, thus preventing children from prematurely releasing the seat belt. In addition, the rear seat belts may be designed such that the only way to release the seat belt is by depressing switch 78 in effort to prevent children from releasing their own seat belts.

Referring to FIGS. 5 and 6, a further embodiment may include positioning a release switch 98 in the rear of the vehicle such that the switch is only accessible when rear vehicle door 100 is open. In this embodiment, switch 98 is mounted in rear door jamb 102. This prevents children from releasing their seat belts while the vehicle is moving or before an adult enters the back seat to assist the child. In addition, the switch may assist in unbuckling a child from a child safety seat.

As shown in FIG. 5, circuit 80 is also provided with timer actuated switch 96 which operates to open the circuit and deenergize solenoid 70 after a predetermined length of time. This prevents solenoid 70 from being continuously energized after seat belt tongue 16 has been released from seat belt buckle 20. Switch 96 is normally closed. However, when vehicle 10 is parked with the engine off for a predetermined amount of time in a parking lot, garage, or the like, timer operated switch 96 will open and deenergize solenoid 70. Switch 96 will close again when the vehicle engine is started.

Even though circuit 80 illustrates three possible scenarios in which seat belt assembly 14 is automatically released, it is understood that any combination of conditions may be used to activate automatic release mechanism 40.

Referring to FIGS. 2, 3, and 4, the operation of seat belt assembly 14 will be described. Buckling assist mechanism 36 includes electromagnet 48 that is energized by switch 49, or by a switch in the belt wind-up mechanism located in strap end housing 32, when seat belt tongue 16 is in close proximity to seat belt buckle 20. Magnetic flux 50, created by electromagnet 48, draws seat belt tongue 16 toward seat belt buckle 20. Sloping surfaces 52, in combination with magnetic flux 50, direct end 84 of seat belt tongue 16 into slot 68 defined in releasing member 66 for receiving seat belt tongue 16. As seat belt tongue 16 is drawn deeper into seat belt buckle 20, end 84 of tongue 16 engages hook portion 62 of latch 54. The progression of tongue 16 into buckle 20 applies a force against hook portion 62 causing latch 54 to pivot in a clockwise direction against the bias of spring 53, away from its initial position shown in FIG. 2. Once hook portion 62 and tongue opening 64 are aligned, latch 54 returns to its initial position under the bias of spring 53 and engages tongue opening 64 (FIG. 3).

Automatic releasing mechanism 40 operates when solenoid 70 is energized. The energization of solenoid 70 causes linkage 72 to be drawn downwardly. Due to the rigid connection between linkage 72 and releasing member 66, the downward movement of linkage 72 also moves releasing member 66 in a downward direction. As can be seen in FIG. 4, slanted surface 86 of releasing member 66 contacts upper surface 88 of hook portion 62. As releasing member 66 continues moving in a downward direction, hook portion 62 and thus latch 54 is pivoted in a clockwise direction, disengaging hook portion 62 from tongue opening 64. Seat belt tongue 16 is then free to be removed from seat belt buckle 20. The belt wind-up mechanism located in strap end housing 32 retracts strap 22 causing strap 22 to return to its unused, storage position (FIG. 1).

As described hereinabove, the embodiment of seat belt tongue 16 as shown in FIG. 7 comprises a generally flat stamped out metal seat belt tongue 16. To further improve the ease with which a seat belt tongue 16 may be inserted into a seat belt buckle 20, the alternative embodiments of FIGS. 8-13 are provided. As seen in FIG. 8, a body portion 112 of a seat belt tongue 16 is substantially longer than that shown in FIG. 7. The total length of the seat belt tongue 16 may be as long as four or five inches for convenience in grasping the tongue 16. Further, the end or tip 114 of seat belt tongue 16 is rounded. As seen in cross section in FIG. 9, body 112 as well as the portion of tip 114 adjacent to body 112 is rounded as seen in cross section in FIG. 9. While the shape of the tongue 16 is not actually elliptical, as shown in FIG. 9, tongue sides 116 and 118 are parallel to each other. Various other shapes may be used. The shape is intended to be substantial in size for ease in grasping the tongue. Further, the end 120 of tip 114 is also rounded and tapered as can be seen in FIGS. 8 and 10. Again, the object of the rounded tapered shape of tip 114 is so that the tip 114 will easily slide into aperture 68 of the seat belt buckle and engage latch 54.

FIG. 11 shows a top view of a buckle 20 wherein the aperture matches the shape of tongue 16 of FIG. 8. As can be seen in FIG. 11 wherein the parts are numbered identically to the numbers shown in buckle 20 of FIGS. 2-4, the shape of aperture 68 matches that of the shape of tongue 16.

Body 112 of tongue 16 may be made of any suitable metal or plastic material, such as, for instance, aluminum or a plastic which is suitably strong and which may be molded. Tip 114 may be made of a ferrous, magnetic, metal whereby tip 114 is drawn into buckle 20 by the magnetic field generated by electromagnet 48. Tongue 16 of FIG. 8 is very easy to grasp as it is quite substantial in size. Since the tapered aperture in buckle 20, shown in FIG. 11, is quite large also, one merely has to bring tongue 16 in proximity of aperture 68, which is easy to do due to the size and shape of tongue 16 and aperture 68 of buckle 20, to allow the magnetic field 50 to attract tip 114 and draw it into aperture 68 of buckle 20.

Figure 12:
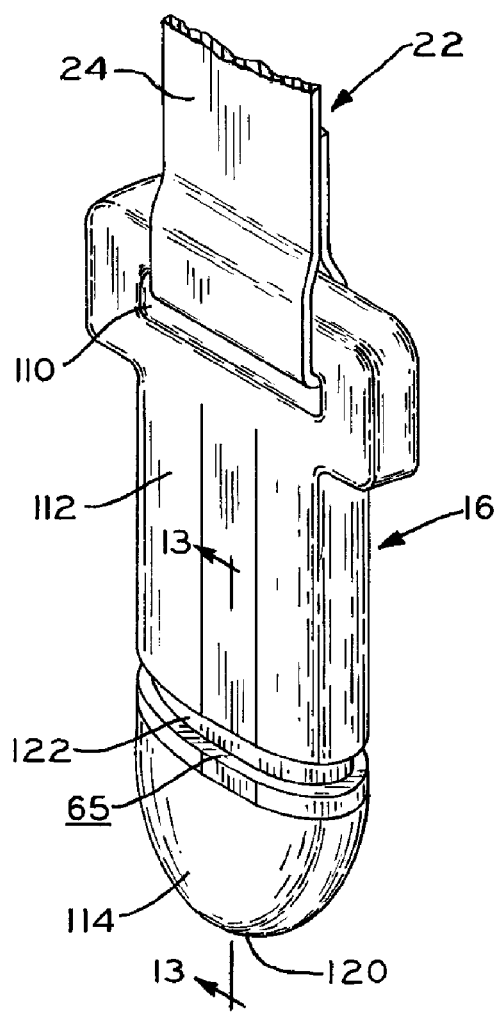
FIG. 12 is an alternative embodiment of the tongue of FIG. 8.
Figure 13:
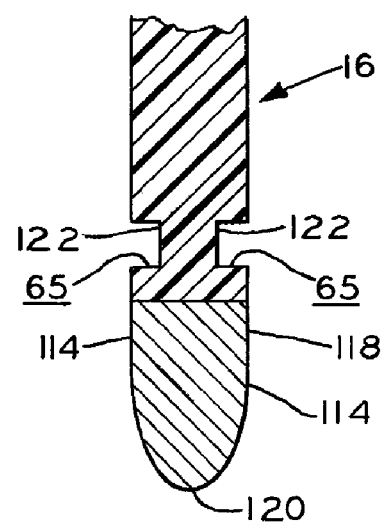
FIG. 13 is a cross sectional view of the tongue of FIG. 12 taken along lines 13-13 thereof.

As can be seen, an aperture 64 is provided in body 112 of tongue 16. This aperture is similar to the aperture shown in tongue 16 of FIGS. 1 and 7. However, it is noted that instead of an aperture 64, a groove 122 surrounding body 16 could be provided to permit latch 54 to capture tongue 16 in buckle 20. An embodiment with a groove 122 is shown in FIGS. 12 and 13 which, in all other respects, is identical to the embodiment of FIG. 8. By providing the groove, which surrounds the entire tongue 16, the buckle can be inserted in two orientations whereby the user does not have to line it up in such a way that the front end 114 of the tongue is properly aligned with the buckle. In other words, the tongue can be oriented either way as latch 54 will always catch groove 122.

Referring to FIGS. 14-17, another embodiment of a seat belt buckle according to the present invention is shown. Seat belt buckle 150 includes a number of components which are similar or identical to the components of buckle 20 shown in FIGS. 1-4 and described above, and identical reference numerals will be used to similar and/or identical components therebetween. Also, except as described below, the general operation of seat belt buckle 150 is substantially identical to that of seat belt buckle 20, and therefore, many of the specific details of the operation of seat belt buckle 150 need not be further specifically discussed. Buckle 150 of FIGS. 14-17 may include buckle assist mechanism 36, latching mechanism 38, and auto release mechanism 40 described above with respect to buckle 20 shown in FIGS. 1-4.

Figure 14:
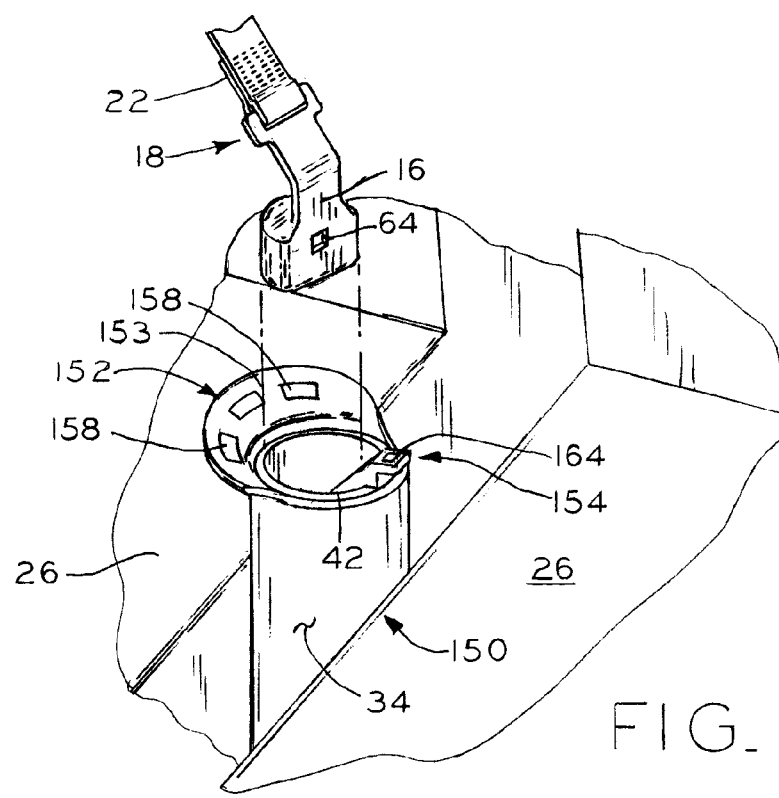
FIG. 14 is a perspective view of a seat belt buckle according to another embodiment.
Figure 15:
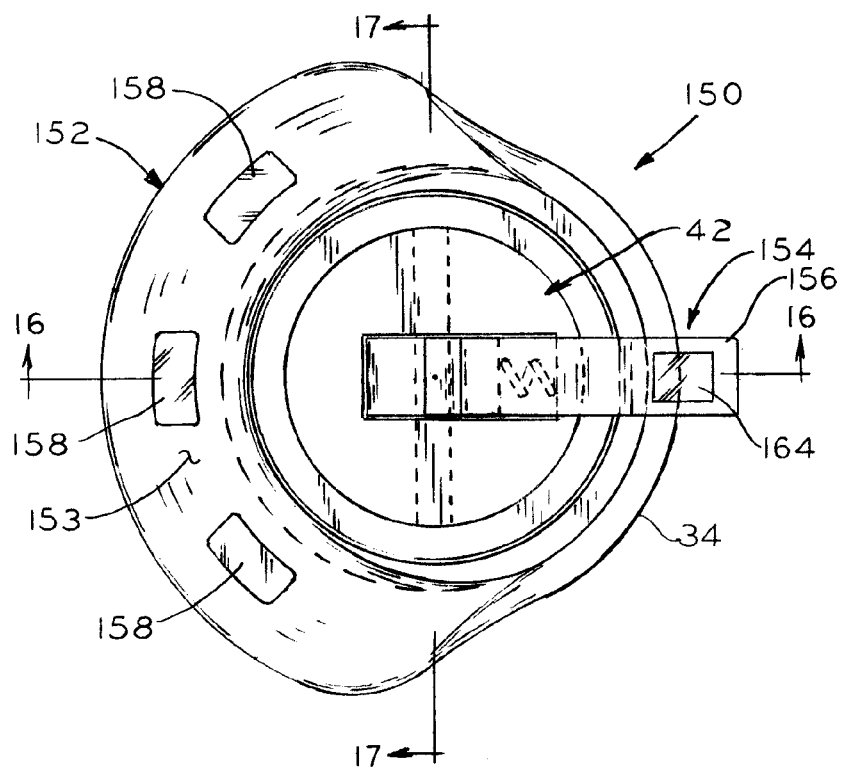
FIG. 15 is a top plan view of the seat belt buckle of FIG. 14.
Figure 16:
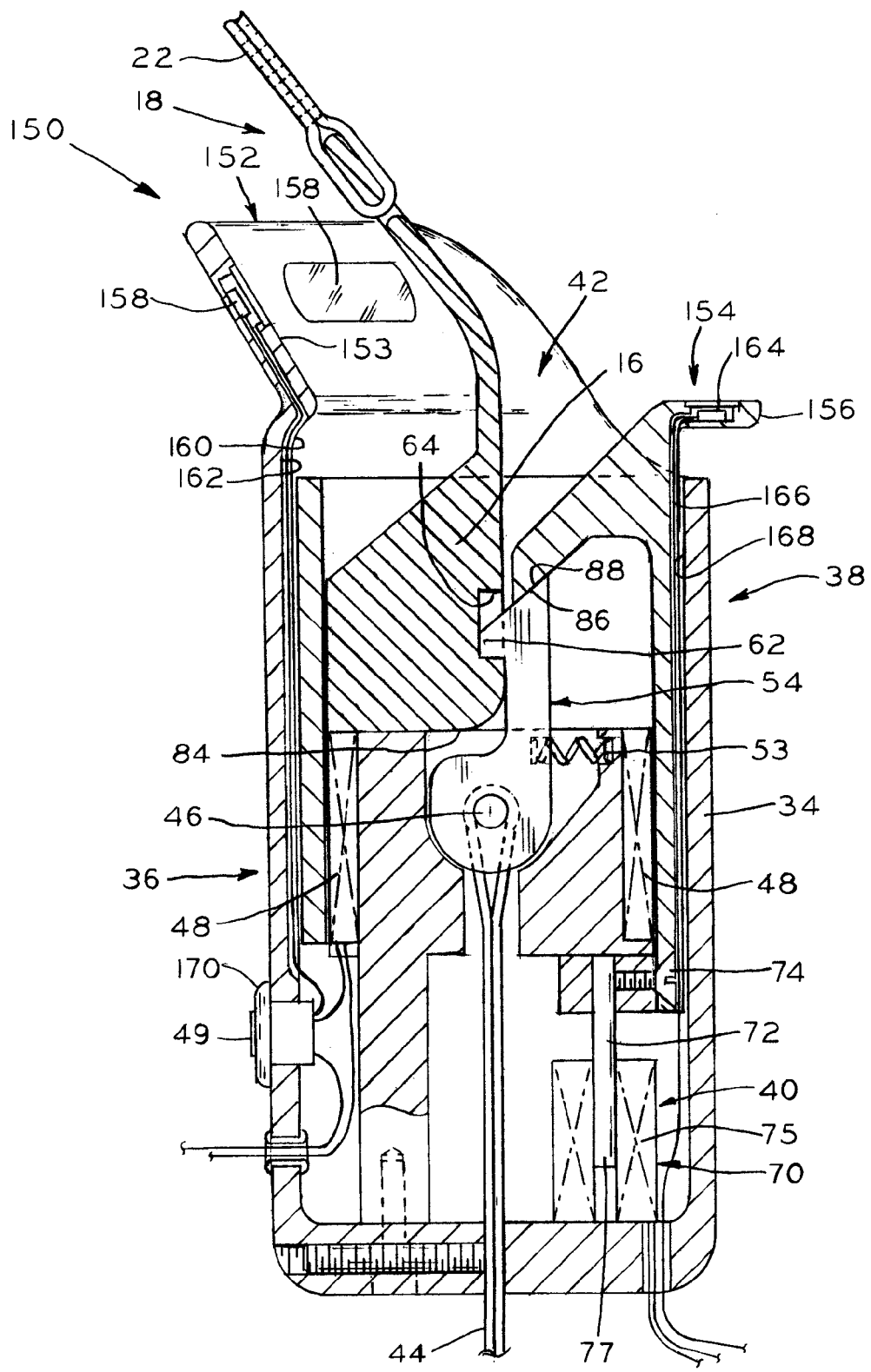
FIG. 16 is a sectional view of the seat belt buckle.
Figure 17:
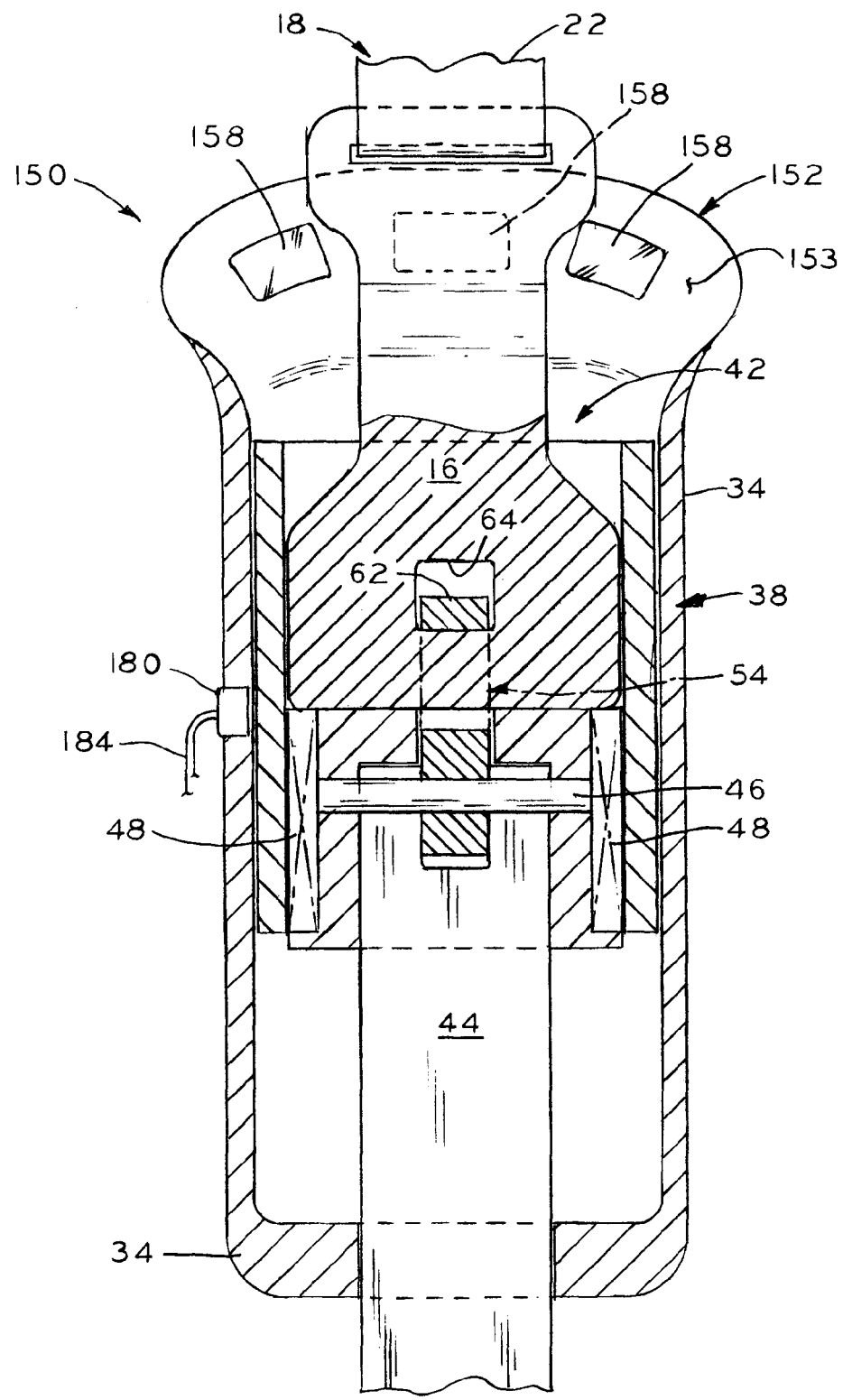
FIG. 17 is another sectional view of the seat belt buckle, taken along line 17-17 of FIG. 15.

The upper, open end 42 of housing 34 of buckle 150 includes funnel region 152, which may be formed integrally with housing 34 or alternatively, may be formed as a separate component which is attached to housing 34. Funnel region 152 at least partially surrounds the open end 42 of housing 34 and is shaped as an outwardly-opening, fluted or substantially cone-shaped region, as shown in FIGS. 14-16, with an inner surface 153 that converges or tapers inwardly toward the interior of buckle 150. Funnel region 152 may extend around the open end of housing 34 through an arc of at least a 180°, or alternatively, through a lesser arc of 145° or 90° or a greater arc of 225° or 270°, for example. As may be seen from FIG. 16, the lower end of funnel region 152 which is connected to housing 34 has a diameter substantially equal to the diameter of the open end of housing 34, while the opposite, upper end of funnel region 152 which is spaced distally from housing 34 has a diameter which is greater than, and progressively increases as same extends away from, the open end of housing 34. As shown in FIGS. 14, 16, and 17, funnel region 152 functions to assist in aligning the seat belt tongue 16 with the open end of housing 34 and thereafter in engaging seat belt tongue 16 with latching mechanism 38. Specifically, any initial contact between seat belt tongue 16 and funnel region 152 of housing 34 tends to direct or channel seat belt tongue 16 downwardly into housing 34 for engagement of seat belt tongue 16 with latching mechanism 38 within housing 34. Also, as shown in FIGS. 14-17, seat belt tongue 16 may be formed with an enlarged, partially arcuate-shaped end that corresponds to the shape of funnel region 152 near the upper end 42 of buckle 150 such that funnel region 152 and upper end 42 of buckle 150 have cooperating geometries.

Buckle 150 additionally includes manual release element 154 in addition to the automatic release mechanism 40 described above. Manual release element 154 may be formed as an extension portion of release member 66, such as a laterally-projecting tongue 156 disposed exteriorly of housing 34 that may be manually depressed by a vehicle passenger to shift or translate release member 66 downwardly to thereby release seat belt tongue 16 in the manner described above.

Further, seat belt buckle 150 may include one or more illuminated areas, which may be formed as portions of funnel region 152, manual release element 154, and/or switch 49 of buckle assist mechanism 36, for example. The illuminated areas may, in one embodiment, be formed as one or more lighting elements such as incandescent elements or light emitting diodes ("LED's"), for example, which are illuminated by power supplied from battery 51 of the automobile (FIG. 5). The light that is emitted by the devices may be of any suitable color, such as white, blue, yellow, orange, or red, and may be of a relatively low intensity to provide passive, soft illumination as described below.

As shown in FIGS. 14-17, funnel region 152 includes an arrangement of three lighting elements 158 mounted within funnel region and spaced along an arc to thereby illuminate funnel region 152 and the open end of housing 34 of buckle 150. A lead 160 extends from lighting elements 158 downwardly through a channel 162 formed in housing 34. Manual release element 154 includes a lighting element 164 mounted therein to illuminate same, and a lead 166 extends from lighting element 164 through a channel 168 formed in housing 34. Switch 49 of buckle assist mechanism 36 includes lighting element 170 therearound to which lead 160 is connected. Leads 160 and 166 are connected to the electrical circuitry of the automobile (FIG. 5), including battery 51.

In use, referring to FIG. 14 as seat belt tongue 16 is brought close to the opening of buckle, either manually or with the assistance of the magnetic flux of buckle assist mechanism 36, seat belt tongue 16, if not directly entering housing, will contact funnel region 152, which will physically guide tongue 16 downwardly into buckle 150 and thereby into the slot of buckle 150 for engagement with latching mechanism 38 in the manner described in detail above. A passenger may release latching mechanism 38 by depressing tongue 156 of manual release element 154 downwardly toward housing 34 to in turn translate release member 66 downwardly within housing 34 and thereby release seat belt tongue 16 as described above.

In one embodiment, lighting elements 158 of funnel region 152 and/or lighting element 170 of switch 49 of buckle assist mechanism 36 of the seat belt buckle 150 are illuminated upon passenger entry into the vehicle to assist the passenger in visually locating seat belt buckle 150 for engaging seat belt tongue 16 with buckle 150 and/or in visually locating switch 49 of buckle assist mechanism 36. With reference to FIGS. 5 and 6, lighting elements 158 and/or 170 may be controlled by switch 98 on vehicle door 100, for example. After seat belt tongue 16 has been engaged with seat belt buckle 150 and/or after the vehicle is started, lighting devices 158 may turn off, or may be controlled by a suitable timer mechanism (not shown) to turn off at a designated time after one of the foregoing events.

In another embodiment, lighting element 164 of manual release element 154 is illuminated when the vehicle is in a parked position or when the engine has been turned off, to assist a passenger in visually locating manual release element 154 of seat belt buckle 150 for disengaging seat belt tongue 16 from buckle 150.

In this manner, illumination of the illuminated areas of buckle 150 aids the vehicle passenger with visually identifying the location of buckle 150, switch 49, and/or manual release element 154 within the vehicle, such as when operating the vehicle at night.

Also, with reference to FIGS. 16 and 18, seat belt buckle 150 may include a latch assist function, described below. In one embodiment, when switch 49 buckle assist mechanism 36 is depressed to activate buckle assist mechanism 36 in the manner described above, solenoid 70 of auto release mechanism 40 may be energized, such as via line 178 provided in the circuit of FIG. 18, to translate release member 66 downwardly within housing 34 in the same manner in the operation of auto release mechanism 40 described above. In this manner, seat belt tongue 16 may be inserted fully into housing 34 without engaging latch 54 of latch mechanism 38 such that latch 54 and its spring 53 do not provide resistance to the insertion of seat belt tongue 16 for easier engagement of seat belt tongue 16 with buckle 150.

After seat belt tongue 16 is inserted fully into housing 34, seat belt tongue detection sensor 180, which may be a known type of magnetic or other proximity sensor, detects same the presence of seat belt tongue 16. Seat belt tongue detection sensor 180 is connected to switch 182 of FIG. 18 via lead 184 (FIGS. 16 and 18) and, upon detection of seat belt tongue 16 by seat belt detection sensor 180, switch 182 is opened to de-energize solenoid 70, thereby causing the solenoid spring or other return mechanism associated with solenoid 70 and auto release mechanism 40 to bias or move release member 66 upwardly within housing 34 to engage latch 54 with seat belt tongue 16 via the bias of spring 53. In this manner, the latching mechanism 38 of buckle 150 will automatically capture and latch seat belt tongue 16 upon opening of seat belt tongue detection switch 180. Also, after seat belt tongue 16 is inserted fully into housing 34, opening of seat belt tongue detection switch 182 (FIGS. 16 and 18) may also de-activate buckle assist mechanism 36.

Figure 18:
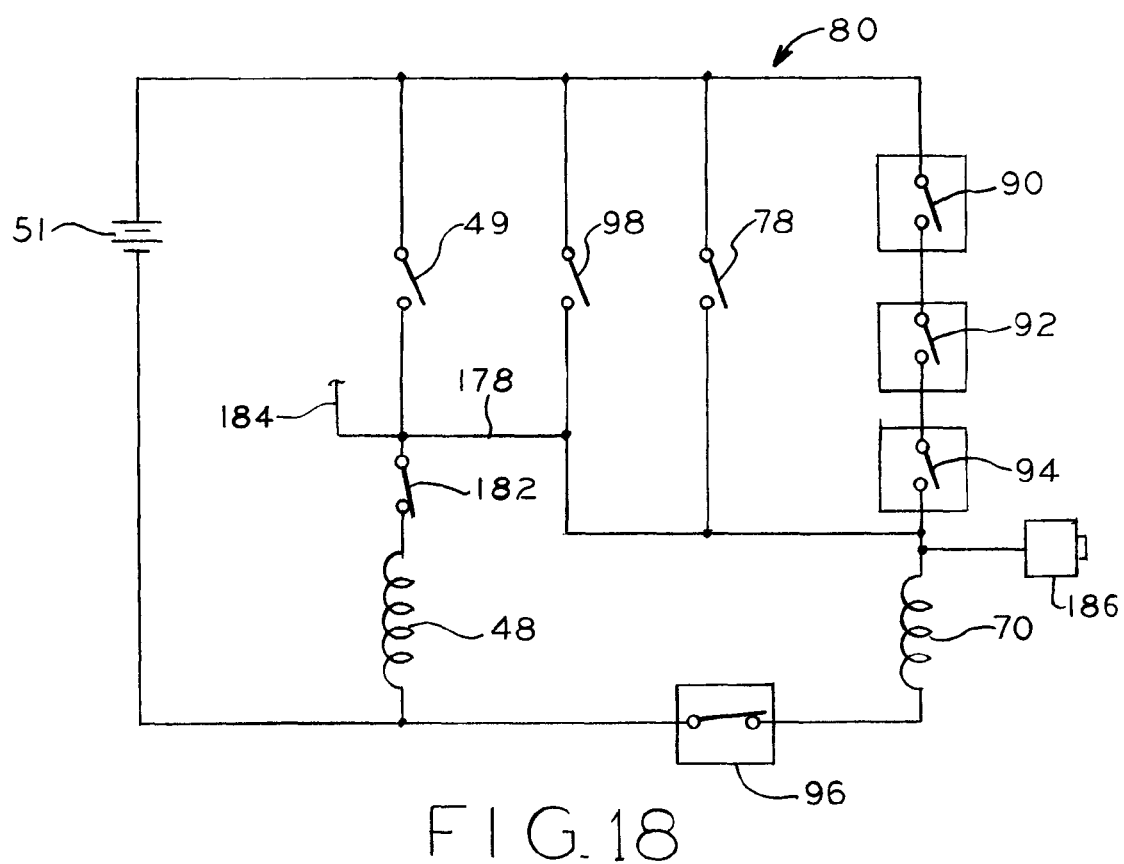
FIG. 18 is a view of a modified version of the circuit of FIG. 5.

Referring to FIG. 18, an on/off switch 186 may be incorporated into each buckle 20 or alternatively, into a suitable location around the dashboard or door of the automobile to disable the solenoid 70 of automatic release mechanism 40 for any particular buckle 20. For example, it may be desirable to disable the automatic release mechanism 40 for buckles 20 in the rear seats of an automobile where children may ride and/or for buckles 20 which are used to secure child seats within the automobile.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A seat belt buckle assembly comprising:
a housing including a first end having an opening;
a funnel region having a generally curved profile, the funnel region comprising:
a lower funnel end disposed adjacent said opening of said housing; and
an upper funnel end spaced from said housing,
said lower funnel end of said funnel region substantially aligned with said opening and having a diameter which is greater than said opening in said housing,
a diameter of said funnel region progressively increases as said funnel region extends away from said opening of said first end of said housing, so that said upper funnel end has a diameter greater than said diameter of said lower funnel end; and
a latch mechanism disposed within said housing.

2. The seat belt buckle assembly of claim 1, wherein said funnel region extends around said opening of said first end of said housing through an arc of at least 180°.

3. The seat belt buckle assembly of claim 1, wherein said funnel region includes at least one lighting element.

4. The seat belt buckle assembly of claim 3, wherein said at least one lighting element is a light emitting diode.

5. The seat belt buckle assembly of claim 1, further comprising a manual release element disposed adjacent said opening of said first end of said housing.

6. The seat belt buckle assembly of claim 1, wherein said latch mechanism comprises a release mechanism comprising:
a release member slidably mounted within said housing, said release member movable between a lower release position and an upper lock position; and
a solenoid operable to move said release member between said upper and lower positions.

7. The seat belt buckle assembly of claim 1, wherein said latch mechanism comprises a release mechanism comprising:
a release member slidably mounted within said housing, said release member movable between a lower release position and an upper lock position, said release member including an extension sized and positioned to facilitate manually moving said release member between said upper and lower positions.

8. A seat belt buckle assembly comprising:
a housing including a first end having an opening;
a funnel region disposed adjacent said first end of said housing, said funnel region substantially aligned with said opening;
a latch mechanism disposed within said housing; and
a magnetic buckle assist mechanism disposed within said housing and including at least one selectively energizable electromagnet.

9. A seat belt buckle assembly comprising:
a housing including a first end having an opening;
a funnel region disposed adjacent said first end of said housing, said funnel region substantially aligned with said opening;
at least one lighting element mounted within said funnel region, disposed proximate said first end of said housing and substantially aligned with said opening; and
a latch mechanism disposed within said housing.

10. The seat belt buckle assembly of claim 9, further comprising a manual release element disposed adjacent said opening of said first end of said housing.

11. The seat belt buckle assembly of claim 10, wherein said at least one lighting element is associated with said manual release element.

12. The seat belt buckle assembly of claim 9, wherein said at least one lighting element is a light emitting diode.

13. The seat belt buckle assembly of claim 9, wherein said latch mechanism comprises a release mechanism comprising:

a release member slidably mounted within said housing, said release member movable between a lower release position and an upper lock position; and
a solenoid operable to move said release member between said upper and lower positions.

14. The seat belt buckle assembly of claim 9, wherein said latch mechanism comprises a release mechanism comprising:
a release member slidably mounted within said housing, said release member movable between a lower release position and an upper lock position, said release member including an extension sized and positioned to facilitate manually moving said release member between said upper and lower positions.

15. The seat belt buckle assembly of claim 9, wherein said seat belt buckle assembly is contained within a vehicle, said latch mechanism comprising a seat belt buckle and said opening is sized to receive a seat belt tongue engageable with said seat belt buckle, the seat belt buckle assembly further comprising:
a circuit operable to toggle said lighting elements between a lighted state and a non-lighted state in response to one of i) engagement of said seat belt tongue with said seat belt buckle, ii) passenger entry into the vehicle, iii) the vehicle being placed into a parked position, and iv) an engine turned of the vehicle being switched between on and off states.

16. A seat belt buckle assembly comprising:
a housing including a first end having an opening;
at least one lighting element disposed proximate said first end; and
a latch mechanism disposed within said housing; and
a magnetic buckle assist mechanism disposed within said housing and including at least one selectively energizable electromagnet.

17. The seat belt buckle assembly of claim 16, wherein said at least one lighting element is associated with a switch of said buckle assist mechanism.

18. A seat belt buckle assembly, comprising:
a seat belt including a tongue;
a housing including a first end having an opening;
a latch mechanism disposed within said housing; and
a latch assist assembly, comprising:
first and second switches; and
an electromagnet operable to move said latch mechanism to a disengaged position with respect to said seat belt tongue upon actuation of said first switch prior to insertion of said seat belt tongue into said buckle assembly, and operable to allow said latch mechanism to move to an engaged position with respect to said seat belt tongue upon actuation of said second switch after insertion of said seat belt tongue into said buckle assembly.

19. The seat belt buckle assembly of claim 18, wherein at least one of said first and second switches comprises one of a seat belt detection sensor and a buckle assist mechanism switch.

20. The seat belt buckle assembly of claim 18, wherein said electromagnet comprises a solenoid.

* * * * *